(12) United States Patent
Wajda et al.

(10) Patent No.: US 12,557,006 B2
(45) Date of Patent: Feb. 17, 2026

(54) RESOURCE AVAILABILITY CHECK

(71) Applicant: NOKIA SOLUTIONS AND NETWORKS OY, Espoo (FI)

(72) Inventors: Wieslawa Wajda, Keltern (DE); Anatoly Andrianov, Schaumburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 632 days.

(21) Appl. No.: 17/765,813

(22) PCT Filed: Sep. 4, 2020

(86) PCT No.: PCT/IB2020/058277
§ 371 (c)(1),
(2) Date: Mar. 31, 2022

(87) PCT Pub. No.: WO2021/064495
PCT Pub. Date: Apr. 8, 2021

(65) Prior Publication Data
US 2022/0377652 A1    Nov. 24, 2022

Related U.S. Application Data

(60) Provisional application No. 62/910,792, filed on Oct. 4, 2019.

(51) Int. Cl.
*H04W 48/16* (2009.01)
*H04W 72/12* (2023.01)
*H04W 72/23* (2023.01)

(52) U.S. Cl.
CPC .......... *H04W 48/16* (2013.01); *H04W 72/12* (2013.01); *H04W 72/23* (2023.01)

(58) Field of Classification Search
CPC ...... H04W 48/16; H04W 72/23; H04W 72/12
USPC ......................................................... 370/329
See application file for complete search history.

(56) References Cited

U.S. PATENT DOCUMENTS

| | | | |
|---|---|---|---|
| 9,760,928 B1 * | 9/2017 | Ward, Jr. ........... | G06Q 30/0619 |
| 2003/0018762 A1 | 1/2003 | Mullen | |
| 2011/0021232 A1 * | 1/2011 | Kazmi .................. | H04W 72/23 |
| | | | 455/509 |
| 2011/0301967 A1 * | 12/2011 | Friedlander ........ | G06Q 10/0631 |
| | | | 705/2 |
| 2017/0141944 A1 | 5/2017 | Lee et al. | |
| 2018/0213421 A1 | 7/2018 | Horvitz et al. | |

(Continued)

FOREIGN PATENT DOCUMENTS

| CN | 108702304 A | 10/2018 |
|---|---|---|
| EP | 2 750 468 A1 | 7/2014 |

(Continued)

OTHER PUBLICATIONS

KDDI Corporation, "ZSM003 Add feasibility check and reservation," ETSI, ZSM(19)000502r3.

(Continued)

*Primary Examiner* — Hermon Asres
(74) *Attorney, Agent, or Firm* — SQUIRE PATTON BOGGS (US) LLP

(57) ABSTRACT

Systems, methods, apparatuses, and computer program products for a resource availability check.

19 Claims, 8 Drawing Sheets

(56) References Cited

U.S. PATENT DOCUMENTS

2018/0227949 A1    8/2018  Tiirola et al.

FOREIGN PATENT DOCUMENTS

WO    WO 2019/116913 A1    9/2019
WO       2020/114587 A1    6/2020

OTHER PUBLICATIONS

Notification of the First Office Action dated Jun. 21, 2024 corresponding to Chinese Patent Application No. 2020800699166, with English translation thereof.
Communication under Rule 71(3) EPC dated Dec. 22, 2023 corresponding to European Patent Application No. 20771623.4.
Examination Report dated Oct. 26, 2022, corresponding to Indian Patent Application No. 202247025135.
International Search Report and Written Opinion dated Oct. 22, 2020 corresponding to International Patent Application No. PCT/IB2020/058277.
Notification of Transmittal of the International Preliminary Report on Patentability and International Preliminary Report on Patentability dated Jan. 19, 2022 corresponding to International Patent Application No. PCT/IB2020/058277.
3GPP TS 28.531 V16.2.0 (Jun. 2019), Technical Specification, 3rd Generation Partnership Project, Technical Specification Group Services and System Aspects; Management and orchestration; Provisioning; (Release 16), Jun. 2019.

\* cited by examiner

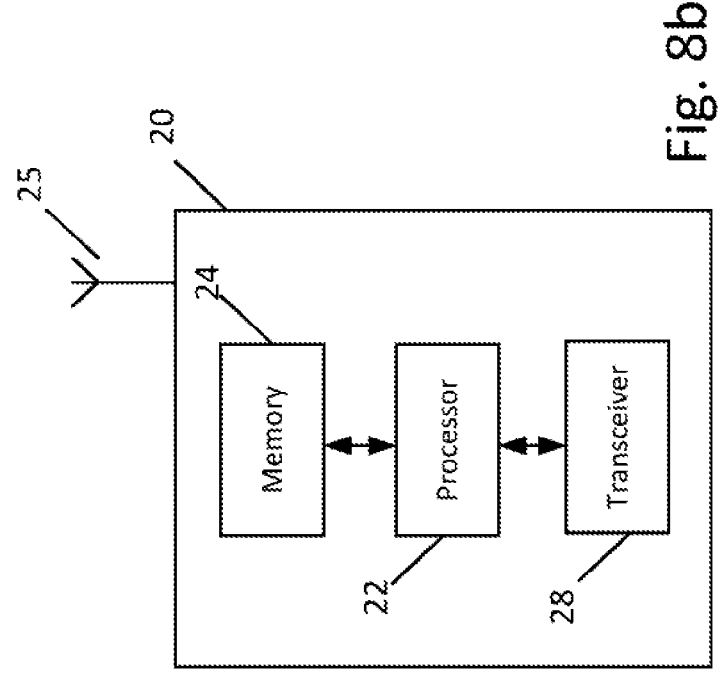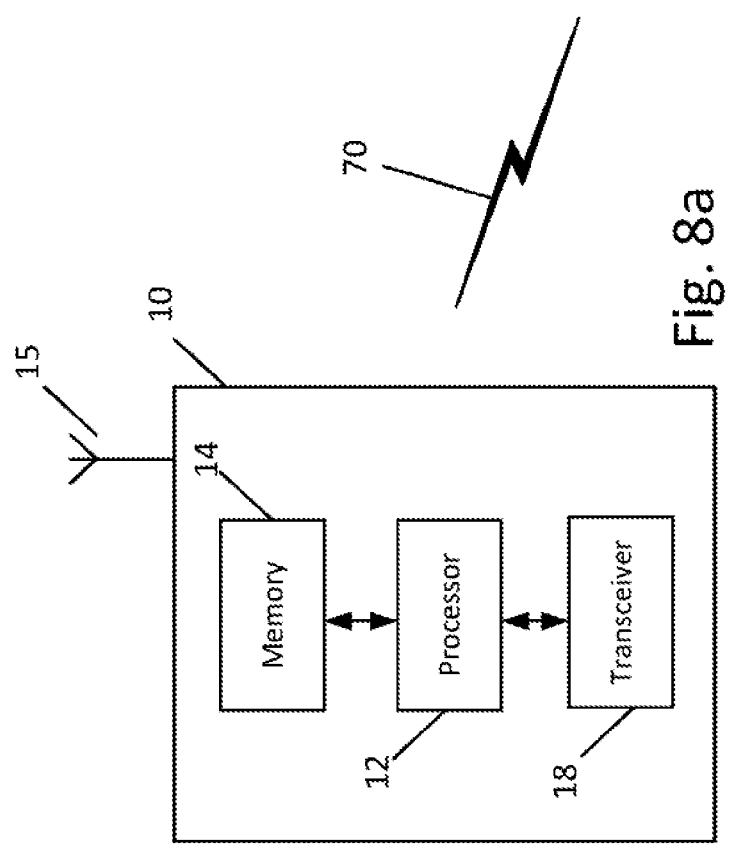

RESOURCE AVAILABILITY CHECK

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for a resource availability check.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein:

FIG. 8a illustrates an example block diagram of an apparatus, according to an embodiment; and FIG. 8b illustrates an example block diagram of an apparatus, according to another embodiment.

DETAILED DESCRIPTION

Figure 1:
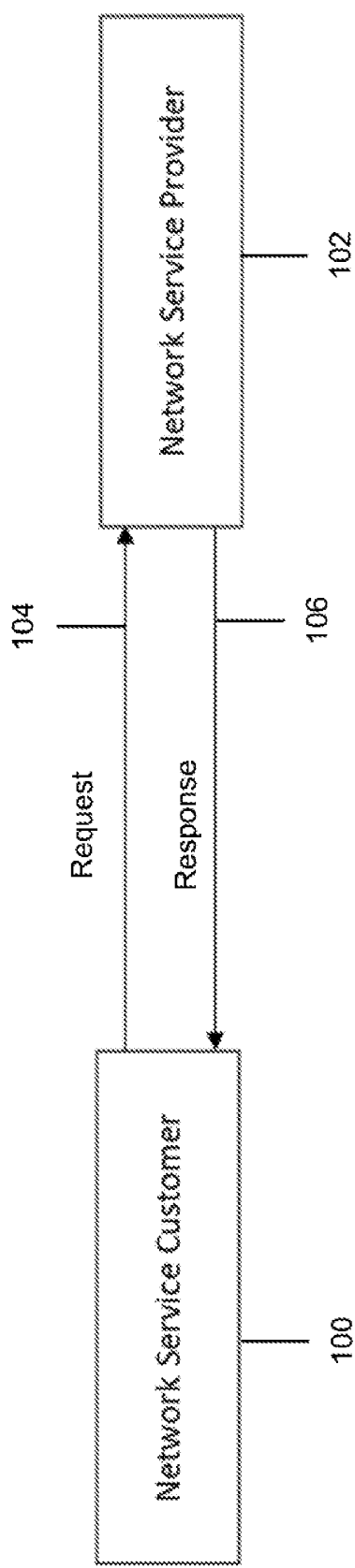
FIG. 1 illustrates an example of a request-response procedure between a customer-side entity and a network-side entity, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for a resource availability check, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

For a network service request, a service customer may only be able to either request a service instantiation starting immediately or to check the feasibility of such service instantiation at the actual time of the request. One potential problem with standardized feasibility check solutions is that a positive result of such a check may not guarantee successful service instantiation, even if the service instantiation is requested immediately after receiving the positive (e.g., feasible) result. This may be due to the resources available during the feasibility check no longer being available (e.g., the resources may be allocated to another service or may be consumed by a concurrent request).

Resource reservation, where resources become occupied immediately and are no longer available for allocation to other services or for use by other consumers, may resolve the previously described problem. However, there may be various possible consequences of such resource reservation. For example, resource reservation may negatively affect resource utilization and may cause a less than optimal resource utilization (e.g., resources may be idle or unused and it may not be possible to allocate the resources to other services). In commercial interactions (e.g., when resources belong to a commercial computing cloud), a consumer may be charged for resources that are reserved on its behalf, but that are never used. This may consume significant costs for customers and may make business planning and implementing business strategies, difficult. From the perspective of a service provider, the service provider may not adequately plan network resource usage without flexibility in resource allocation (e.g., at a specific date and/or time, to estimate the resource availability at a given time in the future, and/or the like).

Some embodiments described herein may provide for a resource availability check. For instance, some embodiments may allow a network entity to determine a probability of network resource availability at a pre-defined time in the future (e.g., a timed feasibility check) and/or to evaluate the feasibility of providing a set of resources at the pre-defined time in the future. For example, the network entity may determine the feasibility of providing a network slice subnet instance (NSSI) at a particular time in the future. The network entity may determine the feasibility based on current or predicted load information, current or predicted resource usage information, and/or the like. This may improve operations of a network by improving resource utilization of resources of the network, which may reduce wasted or idle network resources. In addition, this may facilitate improved planning and/or deployment of the network resources. Further, this may conserve costs with respect to business operations by reducing or eliminating reservation of resources that are not used at the reserved time.

FIG. 1 illustrates an example of a request-response procedure between a customer-side entity and a network-side entity, according to some embodiments. FIG. 1 illustrates a user-side network entity 100 (e.g., a network service customer entity, such as a user equipment (UE)) and a network-side entity 102 (e.g., a network service provider entity, such as a function involved in network function virtualization management and orchestration (NFV MANO), a communication service management function (CSMF), a network slice management function (NSMF), a network slice subnet management function (NSSMF), and/or the like). Although FIG. 1 illustrates a user-side network entity 100 and a network-side entity 102, certain embodiments described herein apply equally to interactions between two or more user-side entities or two or more network-side entities. In addition, although certain embodiments relate to interactions of a network service consumer (NSC) entity and network service provider/producer (NSP) entity, certain embodiments are equally applicable to the interactions of a communication service consumer (CSC) entity and a communication service provider/producer (CSP) entity, or other types of entities.

As illustrated at 104, the user-side entity 100 may provide, and the network-side entity 102 may receive, a request for availability information. For example, the availability information may be related to an availability of one or more resources of a network associated with the network-side entity 102. In some embodiments, a resource may include a subnetwork, a network function, a compute resource, a memory resource, a network resource (e.g., bandwidth), and/or the like. A resource may include a virtualized resource, such as a virtualized network function, a virtual compute resource, a virtual memory resource, a virtual network resource, and/or the like. A resource may be associated with a particular network entity. For example, a resource may be provided by a particular network entity, and the availability information may identify an availability of the resource for that particular entity (e.g., availability may be determined on a per resource per entity basis).

In some embodiments, after receiving the request, the network-side entity 102 may determine a probability of the availability of the one or more resources at a future time and/or during a time period. For example, the network-side entity 102 may determine the probability based on information related to current or predicted load of the one or more resources, current or predicted resource usage of the one or more resources, and/or the like. In some embodiments, to perform a prediction with respect to availability of the one or more resources, the network-side entity 102 may utilize a cross-correlation with other known, planned, or predicted events (e.g., resource and/or network utilization increasing at the time and/or location of a sporting event or concert), may base the prediction on an approximation of observed utilization trends (including period patterns), may utilize a statistical method that reports a predicted value and/or a confidence score, and/or the like. For example, a prediction may be based on data related to a particular location, a regional population, a population structure, a quantity of visitors to a location at a particular time or during a time period, and/or the like. Additionally, or alternatively, for some resources, the prediction may be based on data related to contextual features, such as weather, utilization of a neighboring resource, and/or the like. Use of one or more of these prediction techniques may improve an accuracy of a prediction, which improves resource allocation and/or utilization.

In some embodiments, the probability may be associated with a geographic location or area (e.g., a probability of availability at a geographic location or area), a network function virtualization infrastructure point-of-presence (NFVI PoP) (e.g., a server or a data center), and/or the like. Additionally, or alternatively, the probability may be associated with an entity utilized for network management integration (e.g., for performance, fault, planning, and/or analytics operations).

In some embodiments, the network-side entity 102 may determine, based on the probability, a preferred future time or a preferred future time period of the availability of the one or more resources. For example, the network-side entity 102 may determine that a time or a time period with a highest relative probability (e.g., a highest probability relative to other times or time periods) of availability is a preferred time or a preferred time period. In some embodiments, the highest relative probability may be for a particular geographic location or area, for a particular NFVI PoP, and/or the like. For example, different geographic locations or different NFVI PoPs may be associated with different preferred times or preferred time periods based on the highest relative probabilities being associated with different times or time periods. In some embodiments, the highest relative probability may be for a particular customer-related entity, such as customer, a network tenant, a communication service utilizing a network, and/or the like. Selection of a preferred future time or time period may improve resource allocation and/or utilization by directing requests for resources to times or time periods when the resources have a high likelihood of being available.

In some embodiments, the network-side entity 102 may determine whether a network infrastructure is capable of providing the requested types of resources. For example, the network-side entity 102 may determine whether the network infrastructure is configured with the specific types of resources requested. Additionally, or alternatively, the network-side entity 102 may determine whether the network infrastructure is capable of providing the requested quantities of the one or more resources. For example, the network-side entity 102 may determine whether the network infrastructure is capable of providing the requested amounts of the one or more resources by performing a calculation and/or an analysis of quantitative information related to amounts of resources provided by the network infrastructure. Additionally, or alternatively, the network-side entity 102 may determine whether the one or more resources can be provided at a particular quality (e.g., at a particular quality of service). Performing these types of checks conserves processing resources of the network-side entity 102 with respect to performing a prediction, determining a preferred time or time period, and/or the like as these operations may depend on the network infrastructure passing these checks.

In some embodiments, the network-side entity 102 may determine and/or provide, with the availability information, confidence values associated with a result of determining whether the network infrastructure is capable of providing the requested amounts of network resources (e.g., a confidence value may indicate a confidence in a determining of the network infrastructure's capabilities). Additionally, or alternatively, the network-side entity 102 may provide risk values associated with a result of determining whether the network infrastructure is capable of providing the requested amounts of network resources. For example, the risk value may indicate a risk that the one or more resources will not be available at a future time or during a future time period.

As illustrated at 106, the network-side entity 102 may provide, and the user-side entity 100 may receive, the availability information. The availability information may identify the determined probability for the availability at the future time or during the future time period, the preferred future time or the preferred future time period (e.g., determined based on the highest relative probability), and/or the like. In addition, the network-side entity 102 may provide an indication of whether the requested resources can be provided.

As described above, FIG. 1 is provided as an example. Other examples are possible, according to some embodiments.

Figure 2:
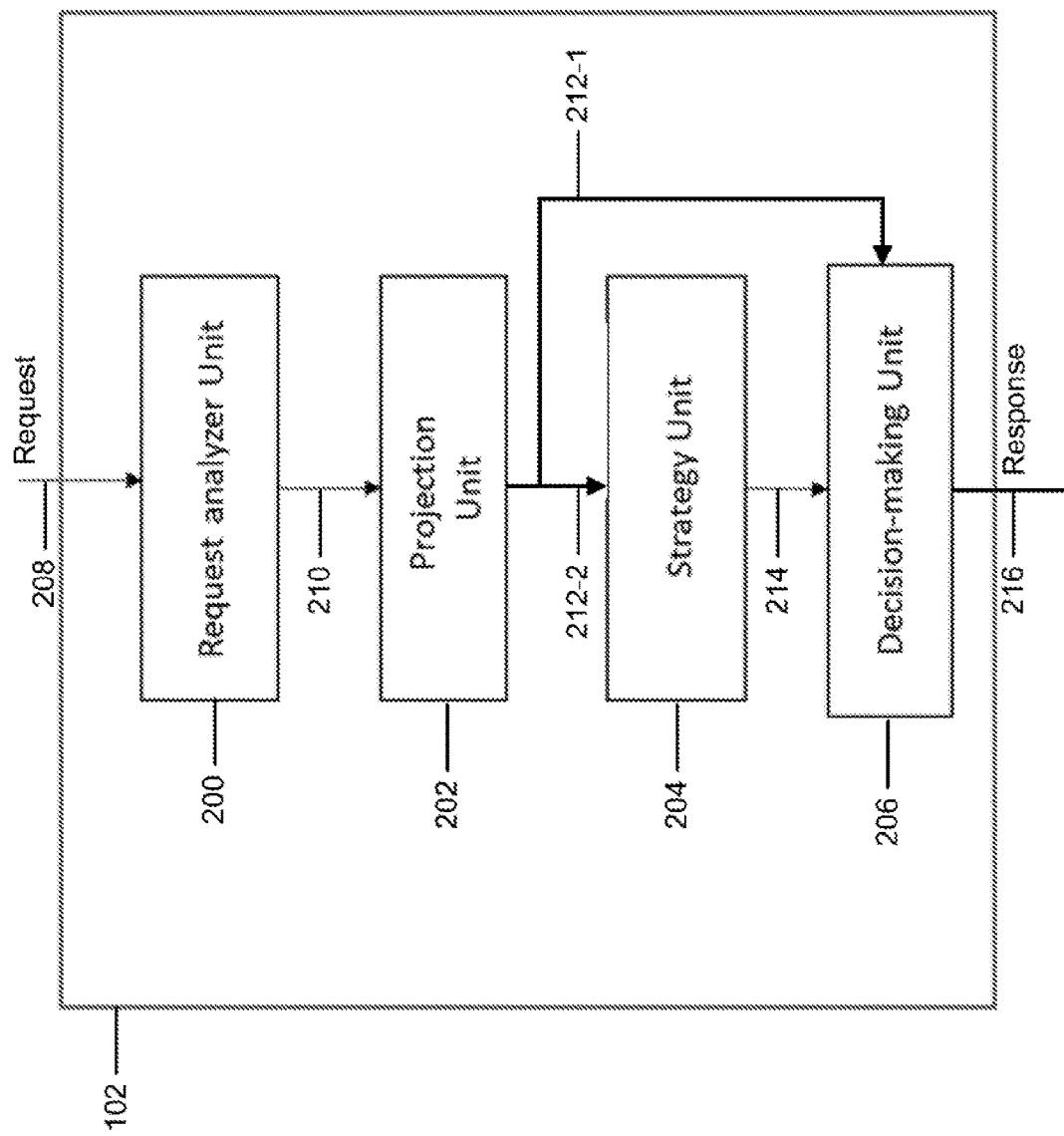
FIG. 2 illustrates an example of processing a request for availability information, according to some embodiments.

FIG. 2 illustrates an example of processing a request for availability information, according to some embodiments. FIG. 2 illustrates one or more example processing elements of the network-side entity 102 of FIG. 1. For example, the one or more processing elements may include a request analyzer unit 200, a projection unit 202, a strategy unit 204, and a decision-making unit 206.

As illustrated at 208, the network-side entity 102 may receive a request for availability information (e.g., from the user-side entity 100) at the request analyzer unit 200. For example, a NSC entity may make a request for availability information related to a specific resource, in a manner similar to that described elsewhere herein. The network-side entity 102 may analyze the request and may identify one or more aspects and/or attributes of the request (e.g., an amount of resources, types of resources, and/or the like may be identified). For example, the request analyzer unit 200 may analyze the request. In some embodiments, the request may be provided using an intent-based method (e.g., an unstructured or partially structured method of making a request), an application programming interface (API)-based method, a template-based method, and/or the like. This may provide the network-side entity 102 with flexibility in the manner in which a request is provided.

As shown at 210, the request analyzer unit 200 may provide information related to the request to the projection unit 202. The projection unit 202 may project the recognized request on the network and network elements to determine if the request can be fulfilled. The projection unit 202 may deliver a satisfactory response (e.g., indicating that the request can be fulfilled) or a response that the request cannot by fulfilled (e.g., that a resource problem has been identified). In the case that the request can be fulfilled, as illustrated at 212-1, the projection unit 202 may provide the response to the decision-making unit 206, where the request can be further evaluated.

In the case that the request cannot be fulfilled based on identification of a lack of resources, the projection unit 202 may, as illustrated at 212-2, provide the response to the strategy unit 204 so that the network-side entity 102 can apply one or more strategies to reduce or eliminate the problem. This may provide the network-side entity 102 with a way to overcome problems that otherwise would prevent resource allocation and/or impede resource utilization. For this, the strategy unit 204 may evaluate, analyze, and/or assess given events and/or hazards. The goal of the assessment may be to determine if the request can be potentially fulfilled and what consequences of some postulates and hazards could be expected. When the strategy unit 204 has completed assessing possible postulated actions, the possible solutions may be delivered to the decision-making unit 206, as illustrated at 214.

The decision-making unit 206, based on delivered solutions that may be marked with weights, may deliver a response that may take into account additional network knowledge. The decision-making unit 206 may comprise an expert system working with databases to improve decision making.

Some of the databases may also be used by the other units described above. The databases may comprise, for example, a knowledge database (e.g., that includes information related to facts about the network or general knowledge, such as network topology, network capabilities, or network capacity, that includes information related to temporal-spatial relations (e.g., for events, such as fluctuating channel conditions at different locations and/or times), and/or the like). Additionally, or alternatively, the databases may comprise a network episodic memory database (e.g., including information related to network state patterns), an association database (e.g., with some proven facts, such as that a network path from entity A to entity B over entity C always performs well, that router X is prone to errors, that if more than X connections are present then network failure is likely to occur, and/or the like), an experience database (e.g., including information related to network experience), a history database (e.g., including information related to network history), and/or the like.

In one embodiment, aspects of the projection unit 202 and/or the strategy unit 204 may be implemented as a simulator based on a generated network model and actual network topology and capabilities. Furthermore, the simulator may be based on a neural network with learning capabilities (e.g., to learn to predict resource availability based on data related to historical resource availability). This may improve prediction related to resource availability.

As indicated above, FIG. 2 is provided as an example. Other examples are possible, according to some embodiments.

Figure 3:
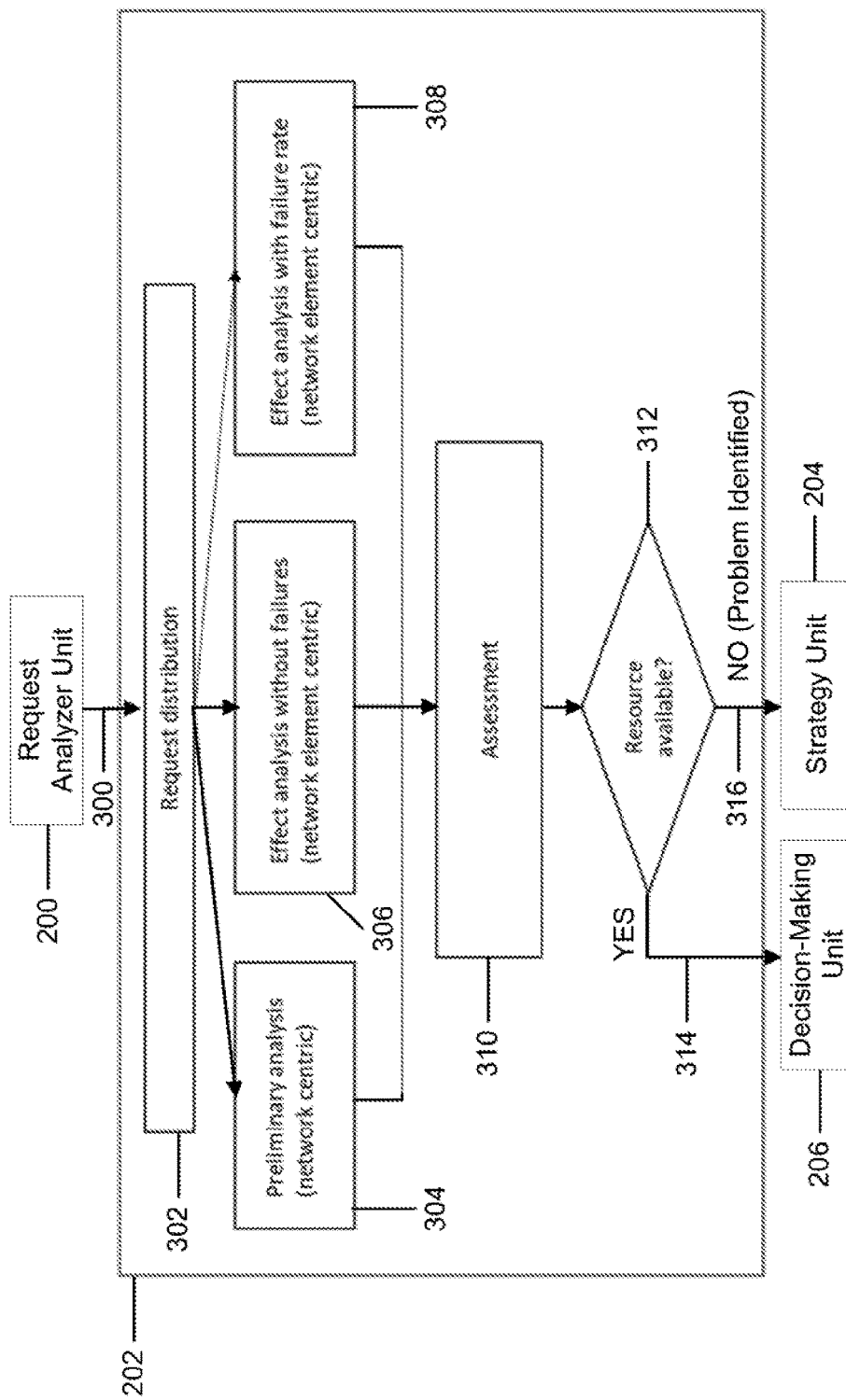
FIG. 3 illustrates example operations of a projection unit, according to some embodiments.

FIG. 3 illustrates example operations of a projection unit, according to some embodiments. FIG. 3 illustrates the request analyzer unit 200, the projection unit 202, the strategy unit 204, and the decision-making unit 206.

As illustrated at 300, the request analyzer 200 may provide, to the projection unit 202, a result of analyzing a request for availability information, as described elsewhere herein. The projection unit 202 may perform, at 302, a request distribution to perform various analytical operations based on information requested from one or more network entities associated with the requested resources. For example, the projection unit 202 may perform, at 304, a preliminary analysis, which may be a network-centric analysis (e.g., a holistic analysis regarding various aspects of a network). Additionally, or alternatively, and as another example, the projection unit 202 may perform, at 306, an analysis of an effect of the request without failures, which may be a network element centric analysis (e.g., regarding an availability of a network element, such as a network node or a network function, under normal circumstances). Additionally, or alternatively, the projection unit 202 may perform, at 308, an analysis of an effect of the request with a failure rate, which may be a network element centric analysis (e.g., regarding outcomes for a network element if a failure occurs in the network element or in another node that is associated with the network element, in which case replacement of the network node, maintenance time, and/or the like may have to be considered).

As shown at 310, the projection unit 202 may compile results of the various analytical operations and may perform an assessment of whether the types and/or amounts of resources requested can be provided by the network infrastructure, a probability of an availability of the one or more resources at a future time or a future time period, a preferred future time or a preferred time period, whether the request can be fulfilled, and/or the like. As shown at 312, the projection unit 202 may determine whether sufficient resources are available (e.g., whether the request can be fulfilled, as described elsewhere herein). If the resources are available (312-YES), then the projection unit 202 may provide, at 314, a response, to the decision-making unit 206, indicating whether the resources are available. If the resources are not available (312-NO), then the projection unit 202 may provide, at 316, a response indicating that the resources are not available (e.g., that a problem with the request for resources has been identified). The decision-making unit 206 and the strategy unit 204 may perform operations similar to that described elsewhere herein.

As described above, FIG. 3 is provided as an example. Other examples are possible, according to some embodiments.

Figure 4:
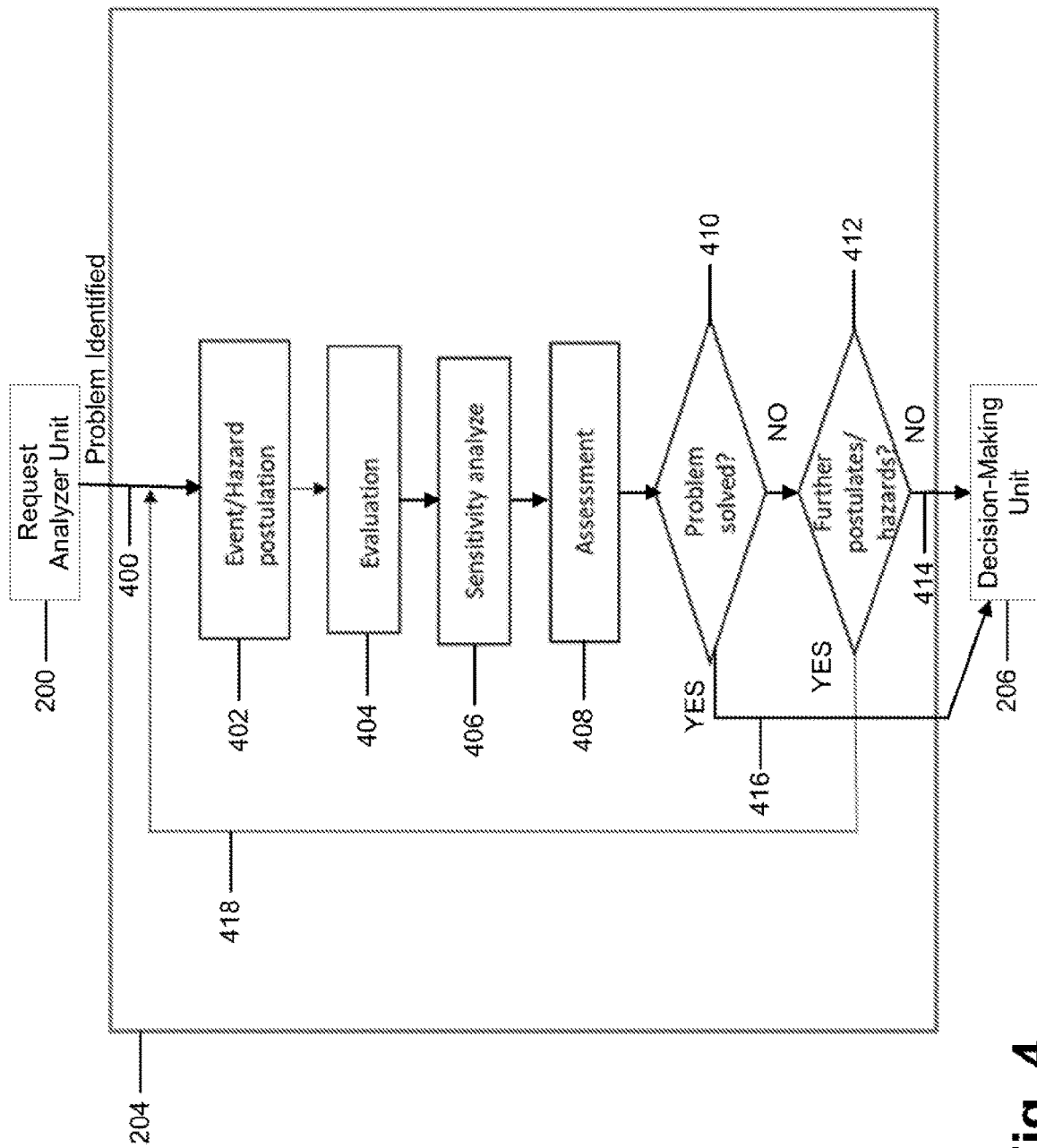
FIG. 4 illustrates example operations of a strategy unit, according to some embodiments.

FIG. 4 illustrates example operations of a strategy unit, according to some embodiments. FIG. 4 illustrates the request analyzer unit 200, the strategy unit 204, and the decision-making unit 206.

As shown at 400, the request analyzer unit 400 may provide a response to the strategy unit 204, as described elsewhere herein (e.g., indicating that a problem with a request for resources has been identified). As shown at 402, the strategy unit 204 may perform an event/hazard postulation, as described elsewhere herein. As shown at 404, the strategy unit 204 may perform an evaluation of the event/hazard postulation. As shown at 406, the strategy unit 406 may perform a sensitivity analysis of the evaluation (e.g., by adjusting amounts of resources requested, a future time or a future time period for providing the resources, and/or the like).

As shown at 408, the strategy unit 204 may perform an assessment of the sensitivity analysis. As show at 410, the strategy unit 204 may determine whether the problem (e.g., that the resource request cannot be fulfilled) has been solved. If the problem has not been solved (410-NO), then the strategy unit 204 may, at 412, determine whether to perform further postulates/hazards. If the strategy unit 204 determines to not perform further postulates/hazards, then the strategy unit 204 may, at 414, provide information indicating that the problem has not been solved to the decision-making unit 206. If the strategy unit 204 determines to perform further postulates/hazards (412-YES), then the strategy unit 204 may, at 418, return to operation 402. If the problem has been solved (410-YES), then the strategy unit 204 may, at 416, provide information indicating that the request can be fulfilled to the decision-making unit 206.

As described above, FIG. 4 is provided as an example. Other examples are possible, according to some embodiments.

Figure 5:
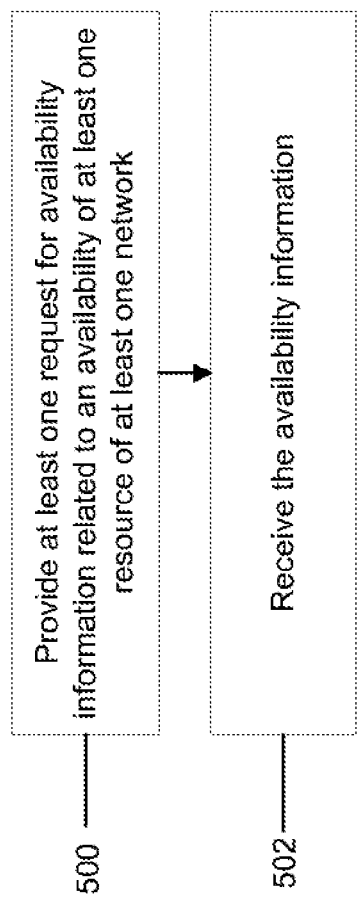
FIG. 5 illustrates an example flow diagram of a method, according to some embodiments.

FIG. 5 illustrates an example flow diagram of a method, according to some embodiments. For example, FIG. 5 shows example operations of a network-side entity (e.g., similar to, or of, apparatus 10 of FIG. 8*a*) and/or a user-side entity (e.g., similar to, or of, apparatus 20 of FIG. 8*b*). Some of the operations illustrated in FIG. 5 may be similar to some operations shown in, and described with respect to, FIGS. 1-4.

In an embodiment, the method may include, at 500, providing at least one request for availability information related to an availability of at least one resource of at least one network. For example, a user-side entity may provide the at least one request to a network-side entity, as described elsewhere herein. In an embodiment, the method may include, at 502, receiving the availability information. For example, the user-side entity may receive the availability information from the network-side entity. The availability information may identify at least one of at least one probability of the availability of the at least one resource for at least one future time or during at least one future time period, and at least one preferred future time or at least one preferred future time period based on the at least one probability.

In some embodiments, the network entity may comprise at least one user-side entity. In some embodiments, the network entity may comprise at least one network-side entity. In some embodiments, the at least one resource may be associated with at least one particular network entity.

In some embodiments, the at least one probability of the availability may be associated with at least one of at least one geographic location or area, or at least one network function virtualization infrastructure (NFVI) point-of-presence (PoP). In some embodiments, the at least one probability of the availability may be associated with at least one entity utilized for network management integration.

In some embodiments, the at least one preferred time or the at least one preferred time period may be associated with a highest relative probability of the availability for the at least one time or the at least one time period. In some embodiments, the at least one preferred time or the at least one preferred time period is associated with a highest relative probability for the availability for at least one of at least one geographic location or area, or at least one network function virtualization infrastructure (NFVI) point-of-presence (PoP). In some embodiments, the at least one preferred time or the at least one preferred time period may be associated with a highest relative probability for the availability for at least one customer-related entity. In some embodiments, the at least one resource may comprise at least one virtual resource.

As described above, FIG. 5 is provided as an example. Other examples are possible according to some embodiments.

Figure 6:
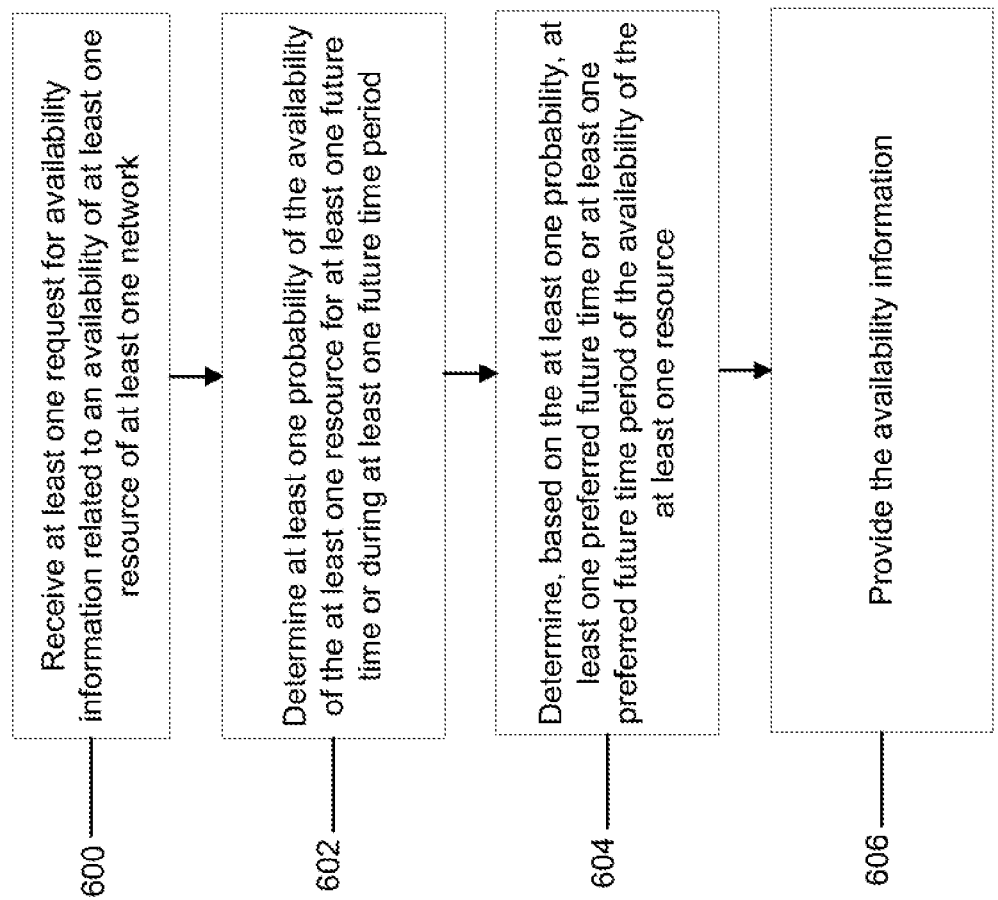
FIG. 6 illustrates an example flow diagram of a method, according to some embodiments.

FIG. 6 illustrates an example flow diagram of a method, according to some embodiments described herein. For example, FIG. 6 shows example operations of a network-side entity (e.g., similar to, or of, apparatus 10 of FIG. 8*a*). Some of the operations illustrated in FIG. 6 may be similar to some operations shown in, and described with respect to, FIGS. 1-4.

In an embodiment, the method may include, at 600, receiving at least one request for availability information related to an availability of at least one resource of at least one network. For example, the network-side entity may receive the at least one request from a user-side entity. In an embodiment, the method may include, at 602, determining at least one probability of the availability of the at least one resource for at least one future time or during at least one future time period. For example, the network-side entity may determine the at least one probability.

In an embodiment, the method may include, at 604, determining, based on the at least one probability, at least one preferred future time or at least one preferred future time period of the availability of the at least one resource. For example, the network-side entity may determine the at least one preferred future time or the at least one preferred future time period. In an embodiment, the method may include at, 606, providing the availability information. For example, the network-side entity may provide the availability information to the user-side entity. The availability information may identify at least the at least one probability of the availability of the at least one resource at the at least one future time or during the at least one future time period, and the at least one preferred future time or the at least one preferred future time period.

In some embodiments, the at least one resource may be associated with at least one particular network entity. In some embodiments, the at least one particular network entity may comprise at least one subnetwork, at least one network function, at least one compute resource, at least one memory resource, or at least one network resource. In some embodiments, the at least one probability of the availability may be associated with at least one of at least one geographic location or area, or at least one network function virtualization infrastructure (NFVI) point-of-presence (PoP). In some embodiments, the at least one probability of the availability may be associated with at least one entity utilized for network management integration.

In some embodiments, the at least one preferred time or the at least one preferred time period may be associated with a highest relative probability of the availability for the at least one time or the at least one time period. In some embodiments, the at least one preferred time or the at least one preferred time period may be associated with a highest relative probability for the availability for at least one of at least one geographic location or area, or at least one network function virtualization infrastructure (NFVI) point-of-presence (PoP). In some embodiments, the at least one preferred time or the at least one preferred time period may be associated with a highest relative probability for the availability for at least one customer-related entity. In some embodiments, the at least one resource may comprise at least one virtual resource.

In some embodiments, the method may further comprise determining whether a network infrastructure is capable of providing one or more requested types of resources. In some embodiments, the method may further comprise performing at least one calculation or at least one analysis of whether the network infrastructure is capable of providing one or more requested amounts of resources. In some embodiments, the method may further comprise providing at least one confidence value that identifies at least one result of performing the at least one calculation or the at least one analysis. In some embodiments, the method may further comprise determining at least one risk value of the availability of the at least one resource. In some embodiments, the network entity may comprise at least one network-side entity.

As described above, FIG. 6 is provided as an example. Other examples are possible, according to some embodiments.

Figure 7:
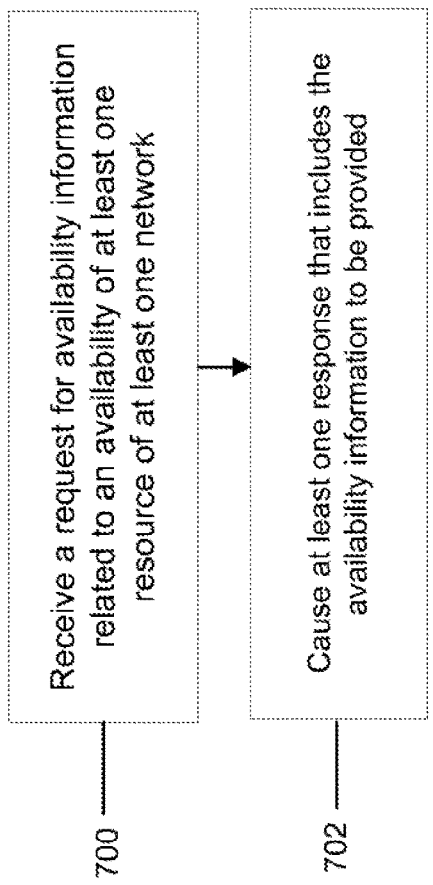
FIG. 7 illustrates an example flow diagram of a method, according to some embodiments.

FIG. 7 illustrates an example flow diagram of a method, according to some embodiments described herein. For example, FIG. 7 shows example operations of a network-side entity (e.g., similar to, or of, apparatus 10 of FIG. 8*a*). Some of the operations illustrated in FIG. 7 may be similar to some operations shown in, and described with respect to, FIGS. 1-4.

In an embodiment, the method may include, at 700, receiving a request for availability information related to an availability of at least one resource of at least one network. For example, a network-side entity may receive the request for the availability information from a user-side entity. In an embodiment, the method may include, at 702, causing at least one response that includes the availability information to be provided. For example, the network-side entity may cause the at least one response that includes the availability information to be provided to the user-side entity. The availability information may identify at least one of at least one probability of the availability of the at least one resource for at least one future time or during at least one future time period, and at least one preferred future time or at least one preferred future time period.

As described above, FIG. 7 is provided as an example. Other examples are possible according to some embodiments.

FIG. 8*a* illustrates an example of an apparatus 10 according to an embodiment. In some embodiments, apparatus 10 may comprise a network-side entity as described elsewhere herein. In some embodiments, apparatus 10 may comprise a node, host, or server in a communications network or serving such a network. For example, apparatus 10 may comprise a network node, satellite, base station, a Node B, an evolved Node B (eNB), 5G Node B or access point, next generation Node B (NG-NB or gNB), and/or a WLAN access point, associated with a radio access network, such as a LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8*a*.

As illustrated in the example of FIG. 8*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of FIGS. 1-7.

For instance, in one embodiment, apparatus 10 may be controlled by memory 14 and processor 12 to receive at least one request for availability information related to an availability of at least one resource of at least one network. In an embodiment, apparatus 10 may be controlled by memory 14 and processor 12 to determine at least one probability of the availability of the at least one resource for at least one future time or during at least one future time period. In an embodiment, apparatus 10 may be controlled by memory 14 and processor 12 to determine, based on the at least one probability, at least one preferred future time or at least one preferred future time period of the availability of the at least one resource. In an embodiment, apparatus 10 may be controlled by memory 14 and processor 12 to provide the availability information, wherein the availability information identifies at least the at least one probability of the availability of the at least one resource at the at least one future time or during the at least one future time period, and the at least one preferred future time or the at least one preferred future time period.

In another embodiment, apparatus 10 may be controlled by memory 14 and processor 12 to provide at least one request for availability information related to an availability of at least one resource of at least one network. In an embodiment, apparatus 10 may be controlled by memory 14 and processor 12 to receive the availability information. The availability information may identify at least one of at least one probability of the availability of the at least one resource for at least one future time or during at least one future time period, and at least one preferred future time or at least one preferred future time period based on the at least one probability.

In an embodiment, apparatus 10 may be controlled by memory 14 and processor 12 to receive a request for availability information related to an availability of at least one resource of at least one network. In an embodiment, apparatus 10 may be controlled by memory 14 and processor 12 to cause at least one response that includes the availability information to be provided. The availability information may identify at least one of at least one probability of the availability of the at least one resource for at least one future time or during at least one future time period, and at least one preferred future time or at least one preferred future time period.

FIG. 8b illustrates an example of an apparatus 20 according to another embodiment. In some embodiments, apparatus 20 may comprise a user-side entity, as described elsewhere herein. In some embodiments, apparatus 20 may comprise a node, host, or server in a communications network or serving such a network, similar to apparatus 10 described above. For example, apparatus 20 may comprise a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some embodiments, apparatus 20 may comprise a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8b.

As illustrated in the example of FIG. 8b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may comprise a network node, satellite, base station, a Node B, an eNB, a 5G Node B or access point, a NG-NB or gNB, a LAN access point, a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in, or described with respect to, any of FIGS. 1-7.

For instance, in an embodiment, apparatus 20 may be controlled by memory 24 and processor 22 to provide at least one request for availability information related to an availability of at least one resource of at least one network. In an embodiment, apparatus 20 may be controlled by memory 24 and processor 22 to receive the availability information, wherein the availability information identifies at least one of at least one probability of the availability of the at least one resource for at least one future time or during at least one future time period, and at least one preferred future time or at least one preferred future time period based on the at least one probability.

Therefore, certain example embodiments provide several technological improvements, enhancements, and/or advantages over existing technological processes. For example, one benefit of some example embodiments is a reduction in reserved, but unused, resources provided by a network. In addition, another example benefit is an improvement in resource utilization optimization. Accordingly, the use of some example embodiments results in improved functioning of communications networks and their nodes and, therefore constitute an improvement at least to the technological field of network resource allocation, utilization, and/or optimization, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code.

Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network-entity equally applies to embodiments that include multiple instances of the network-entity, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include receiving at least one request for availability information related to an availability of at least one resource of at least one network. The method may include determining at least one probability of the availability of the at least one resource for at least one future time or during at least one future time period. The method may include determining, based on the at least one probability, at least one preferred future time or at least one preferred future time period of the availability of the at least one resource. The method may include providing the availability information. The availability information identifies at least: the at least one probability of the availability of the at least one resource at the at least one future time or during the at least one future time period, and the at least one preferred future time or the at least one preferred future time period.

In a variant, the at least one resource may be associated with at least one particular network entity. In a variant, the at least one particular network entity may comprise at least one subnetwork, at least one network function, at least one compute resource, at least one memory resource, or at least one network resource. In a variant, the at least one probability of the availability may be associated with at least one of: at least one geographic location or area, or at least one network function virtualization infrastructure (NFVI) point-of-presence (PoP).

In a variant, the at least one probability of the availability may be associated with at least one entity utilized for network management integration. In a variant, the at least one preferred time or the at least one preferred time period may be associated with a highest relative probability of the availability for the at least one time or the at least one time period. In a variant, the at least one preferred time or the at least one preferred time period may be associated with a highest relative probability for the availability for at least one of: at least one geographic location or area, or at least one network function virtualization infrastructure (NFVI) point-of-presence (PoP).

In a variant, the at least one preferred time or the at least one preferred time period may be associated with a highest relative probability for the availability for at least one customer-related entity. In a variant, at least one resource may comprise at least one virtual resource. In a variant, the method may comprise determining whether a network infrastructure is capable of providing one or more requested types of resources. In a variant, the method may include performing at least one calculation or at least one analysis of whether the network infrastructure is capable of providing one or more requested amounts of resources. In a variant, the method may include providing at least one confidence value that identifies at least one result of performing the at least one calculation or the at least one analysis. In a variant, the method may include determining at least one risk value of the availability of the at least one resource. In a variant, the network entity comprises at least one network-side entity.

According to a second embodiment, a method may include providing at least one request for availability information related to an availability of at least one resource of at least one network. The method may include receiving, by the network entity, the availability information. The availability information identifies at least one of at least one probability of the availability of the at least one resource for at least one future time or during at least one future time period, and at least one preferred future time or at least one preferred future time period based on the at least one probability. In a variant, the network entity may comprise at least one user-side entity. In a variant, the network entity comprises at least one network-side entity.

According to a third embodiment, a method may include receiving a request for availability information related to an availability of at least one resource of at least one network. The method may include causing at least one response that includes the availability information to be provided. The availability information may identify at least one of at least one probability of the availability of the at least one resource for at least one future time or during at least one future time period, and at least one preferred future time or at least one preferred future time period.

A fourth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, or the third embodiment, or any of the variants discussed above.

A fifth embodiment may be directed to an apparatus that may include circuitry configured to perform the method according to the first embodiment, the second embodiment, or the third embodiment, or any of the variants discussed above.

A sixth embodiment may be directed to an apparatus that may include means for performing the method according to the first embodiment, the second embodiment, or the third embodiment, or any of the variants discussed above.

A seventh embodiment may be directed to a computer readable medium comprising program instructions stored thereon for performing at least the method according to the first embodiment, the second embodiment, or the third embodiment, or any of the variants discussed above.

An eighth embodiment may be directed to a computer program product encoding instructions for performing at least the method according to the first embodiment, the second embodiment, or the third embodiment, or any of the variants discussed above.

We claim:

1. A method, comprising:
   receiving, by a network entity, at least one request for availability information related to an availability of at least one resource of at least one network;
   determining, by the network entity, at least one probability of the availability of the at least one resource for at least one future time or during at least one future time period;
   determining, by the network entity and based on the at least one probability, at least one first future time or at least one second future time period of the availability of the at least one resource, wherein the at least one first future time is at least one time with a highest probability of availability relative to other times, and the at least one second future time period is at least one time period with a highest probability of availability relative to other time periods; and
   providing, by the network entity, the availability information, wherein the availability information identifies at least one of the at least one first future time or the at least one second future time period; wherein
   the at least one resource includes at least one of a subnetwork, a network function, a compute resource, a memory resource, or a virtualized resource.

2. The method according to claim 1, wherein the at least one resource is associated with at least one particular network entity.

3. The method according to claim 1, wherein the at least one probability of the availability is associated with at least one of:
at least one geographic location or area, or
at least one network function virtualization infrastructure (NFVI) point-of-presence (POP).

4. The method according to claim 1, wherein the at least one probability of the availability is associated with at least one entity utilized for network management integration.

5. The method according to claim 1, wherein the at least one first future time is associated with a highest relative probability of the availability for the at least one time or the at least one second future time period is associated with a highest relative probability of availability for the at least one time period.

6. The method according to claim 1, wherein the at least one first future time or the at least one second future time period is associated with a highest relative probability for the availability for at least one of:
at least one geographic location or area, or
at least one network function virtualization infrastructure (NFVI) point-of-presence (POP).

7. The method according to claim 1, wherein the at least one first future time or the at least one second future time period is associated with a highest relative probability for the availability for at least one customer-related entity.

8. The method according to claim 1, further comprising:
determining, by the network entity, whether a network infrastructure is capable of providing one or more requested types of resources; and
performing, by the network entity, at least one calculation or at least one analysis of whether the network infrastructure is capable of providing the one or more requested amounts of resources.

9. The method according to claim 8, further comprising:
providing, by the network entity, at least one confidence value that identifies at least one result of performing the at least one calculation or the at least one analysis.

10. The method according to claim 1, further comprising:
determining, by the network entity, at least one risk value of the availability of the at least one resource.

11. The method according to claim 1, wherein the network entity comprises at least one network-side entity.

12. The method according to claim 1, wherein the availability information further identifies at least the at least one probability of the availability of the at least one resource at the at least one future time or during the at least one future time period.

13. A method, comprising:
providing, by an entity, at least one request for availability information related to an availability of at least one resource of at least one network; and
receiving, by the entity, the availability information, wherein the availability information identifies:
at least one of at least one first future time or at least one second future time period based on at least one probability of the availability of the at least one resource for at least one future time or during at least one future time period; wherein
the at least one resource includes at least one of a subnetwork, a network function, a compute resource, a memory resource, or a virtualized resource;
the at least one first future time is at least one time with a highest probability of availability relative to other times; and
the at least one second future time period is at least one time period with a highest probability of availability relative to other time periods.

14. The method according to claim 13, wherein the entity comprises at least one user-side entity.

15. The method according to claim 13, wherein the entity comprises at least one network-side entity.

16. An apparatus, comprising:
at least one processor; and
at least one memory storing instructions that,
when executed by the at least one processor, cause the apparatus at least to:
receive at least one request for availability information related to an availability of at least one resource of at least one network;
determine at least one probability of the availability of the at least one resource for at least one future time or during at least one future time period;
determine, based on the at least one probability, at least one first future time or at least one second future time period of the availability of the at least one resource; and
provide the availability information, wherein the availability information identifies at least one of the at least one first future time or the at least one second future time period; wherein
the at least one resource includes at least one of a subnetwork, a network function, a compute resource, a memory resource, or a virtualized resource;
the at least one first future time is at least one time with a highest probability of availability relative to other times; and
the at least one second future time period is at least one time period with a highest probability of availability relative to other time periods.

17. A computer program embodied on a non-transitory computer readable medium, said computer program comprising program instructions which, when executed on an apparatus, cause the apparatus to perform at least the following:
receiving at least one request for availability information related to an availability of at least one resource of at least one network;
determining at least one probability of the availability of the at least one resource for at least one future time or during at least one future time period;
determining, based on the at least one probability, at least one first future time or at least one second future time period of the availability of the at least one resource; and
providing the availability information, wherein the availability information identifies at least the at least one first future time or the at least one second future time period; wherein
the at least one resource includes at least one of a subnetwork, a network function, a compute resource, a memory resource, and a virtualized resource;
the at least one first future time is at least one time with a highest probability of availability relative to other times; and
the at least one second future time period is at least one time period with a highest probability of availability relative to other time periods.

18. An apparatus, comprising:
at least one processor; and
at least one memory storing instructions that, when executed by the at least one processor, cause the apparatus at least to:

provide at least one request for availability information related to an availability of at least one resource of at least one network; and receive the availability information, wherein the availability information identifies:

at least one of at least one first future time or at least one future second future time period based on the at least one probability of the availability of the at least one resource for at least one future time or during at least one future time period; wherein the at least one resource includes at least one of a subnetwork, a network function, a compute resource, a memory resource, or a virtualized resource;

the at least one first future time is at least one time with a highest probability of availability relative to other times; and the at least one second future time period is at least one time period with a highest probability of availability relative to other time periods.

19. A computer program embodied on a non-transitory computer-readable medium, said computer program comprising program instructions which, when executed on an apparatus, cause the apparatus to perform at least the following:

providing at least one request for availability information related to an availability of at least one resource of at least one network; and receiving the availability information, wherein the availability information identifies:

at least one of at least one first future time or at least one second future time period based on at least one probability of the availability of the at least one resource for at least one future time or during at least one future time period; wherein the at least one resource includes at least one of a subnetwork, a network function, a compute resource, a memory resource, or a virtualized resource;

the at least one first future time is at least one time with a highest probability of availability relative to other times; and the at least one second future time period is at least one time period with a highest probability of availability relative to other time periods.

* * * * *